United States Patent [19]

Bier

[11] 4,313,903

[45] Feb. 2, 1982

[54] PROCESS FOR INJECTION MOLDING OF POLYETHYLENE TEREPHTHALATE COMPOSITIONS AT REDUCED MOLD TEMPERATURE

[75] Inventor: Peter Bier, New Martinsville, W. Va.

[73] Assignee: Bayer Aktiengesellschaft, Leverkusen, Fed. Rep. of Germany

[21] Appl. No.: 95,275

[22] Filed: Nov. 19, 1979

[51] Int. Cl.$^3$ .............................. B29F 1/00; B28B 1/24
[52] U.S. Cl. .............................. 264/328.1; 260/45.8 R; 525/6
[58] Field of Search .................. 264/328.1; 260/45.8; 525/6

[56] References Cited

U.S. PATENT DOCUMENTS

| | | | |
|---|---|---|---|
| 3,368,995 | 2/1968 | Furukawa et al. | 260/40 |
| 3,405,198 | 10/1968 | Rein | 264/328 |
| 3,516,957 | 6/1970 | Gray, Jr. et al. | 260/22 |
| 3,560,605 | 2/1971 | Siggel et al. | 264/328 |
| 3,624,024 | 11/1971 | Caldwell et al. | 260/40 R |
| 3,692,744 | 9/1972 | Rich et al. | 260/75 T |
| 3,868,388 | 2/1975 | Dotson et al. | 260/326 N |
| 3,873,567 | 3/1975 | Cyba | 260/326 C |
| 3,915,930 | 10/1975 | Dotson et al. | 260/45.8 N |
| 3,923,734 | 12/1975 | Dotson, Jr. et al. | 260/45.75 B |
| 4,001,179 | 1/1977 | Richter et al. | 260/45.75 B |
| 4,003,862 | 1/1977 | Albright | 260/2.5 AJ |
| 4,087,441 | 5/1978 | Lee | 260/326 N |
| 4,096,202 | 6/1978 | Farnham et al. | 260/873 |
| 4,186,263 | 1/1980 | Morello | 264/328 |
| 4,212,791 | 7/1980 | Avery et al. | 260/40 R |

FOREIGN PATENT DOCUMENTS 50-119041 9/1975 Japan .
1287934 6/1972 United Kingdom .

Primary Examiner—Donald E. Czaja
Assistant Examiner—W. Thompson
Attorney, Agent, or Firm—Gene Harsh; Lawrence S. Pope

[57] ABSTRACT

This disclosure is concerned with a process for injection molding polyethylene terephthalate into colder molds, i.e., less than 120° C., and still obtaining crystalline parts by incorporating an organic imide containing compound having a melting point in excess of 240° C. into the composition. The presence of this additive enhances the crystallization velocity of the composition and permits the achievement of crystalline parts with optimum properties with colder molds and shorter molding cycles than are conventional for polyethylene terephthalate molding compositions.

1 Claim, No Drawings

PROCESS FOR INJECTION MOLDING OF POLYETHYLENE TEREPHTHALATE COMPOSITIONS AT REDUCED MOLD TEMPERATURE

BACKGROUND OF THE INVENTION

The present invention broadly relates to a process for injection molding a thermoplastic composition comprising:

(a) intimately blending (i) from 80 to 97% by weight of a polyethylene terephthalate having an intrinsic viscosity of at least about 0.3 dl/g, preferably at least about 0.5 dl/g, measured as a 0.5% by weight solution in a 1:1 mixture of phenol and tetrachloroethane at 25° C., (ii) from 3 to 20%, preferably from 5 to 15%, by weight of an organic compound containing at least one imide group and having a melting point greater than 240° C., and (b) injection molding the resultant blend into a mold held at a temperature of no more than 120° C. and no less than 70° C.

DETAILED DESCRIPTION OF THE INVENTION

The invention is directed broadly to the injection molding of a two-component composition, i.e. a polyalkylene terephthalate and the imide-group containing compound.

The dicarboxylic acid component of the polyethylene terephthalate (a) consists mainly of terephthalic acid and may contain up to 10 mol %, based on the total mols of acid of other aromatic dicarboxylic acids having from 6 to 14 carbon atoms, of aliphatic dicarboxylic acids having from 4 to 8 carbon atoms or of cycloaliphatic dicarboxylic acids having from 8 to 12 carbon atoms. Examples of such dicarboxylic acids which may be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The diol component of the polyethylene terephthalate consists mainly of ethylene glycol. It may, however, contain up to 10 mol % of aliphatic diols having from 3 to 12 carbon atoms, cycloaliphatic diols having from 6 to 15 carbon atoms or aromatic diols having from 6 to 21 carbon atoms. Examples of such additional diols ("codiols") include propane-1,3-diol, butane-1,4-diol, pentane-1,5-diol, hexane-1,6-diol or cyclohexane-1,4-dimethanol, 3-methyl-pentanediol-(2,4), 2-methyl-pentanediol-(1,4), 2,2,4-trimethylpentanediol-(1,3), 2-ethylhexanediol-(1,3), 2,2-diethylpropanediol-(1,3), hexanediol-(1,3), 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane.

The polyethylene terephthalates can be branched by incorporating relatively small amounts of trihydric or tetrahydric alcohols or tribasic or tetrabasic acids as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mol % of branching agent, based on the quantity of acid component.

Polyethylene terephthalates derived mainly from terephthalic acid and ethylene glycol are preferred and homoethylene terephthalate, i.e. a product produced substantially only from ethylene glycol and terephthalate acid or its esters, or its anhydride is most preferred.

The polyethylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g. those described by R. E. Wilfong in J. Polym. Sci. 54, 385 (1961). Some of these catalysts (A) are more powerful accelerators of the esterification reaction (a), others (B) for the polycondensation reaction (b), and still others (C) are fairly active for both (a) and (b).

The following are examples of catalysts (A) which are suitable for accelerating reaction (a):

1. Lithium, sodium, potassium, calcium, strontium and boron in the form of the metals or their oxides, hydrides, formates, acetates, alcoholates, or glycolates;
2. Calcium and strontium chlorides and bromides;
3. Tertiary amines;
4. Calcium and strontium malonates, adipates, benzoates, etc.;
5. Lithium salts of dithiocarbamic acids.

The following are examples of catalysts (B) suitable for the polycondensation reaction (b):

1. Molybdenum, germanium, lead, tin and antimony in the form of the metals or their oxides, hydrides, formates, alcoholates or glycolates;
2. Zinc and lead perborates and borates;
3. Zinc, manganese(II), cobalt, magnesium, chromium, ion and cadmium succinates, butyrates, adipates or enolates of a diketone;
4. Zinc chloride and bromide;
5. Lanthanum dioxide and titanate;
6. Neodymium chloride;
7. Mixed salts of antimony, e.g. potassium antimony tartrate, and salts of antimonic acids, such as potassium pyroantimonate;
8. Zinc or manganese salts of dithiocarbamic acids;
9. Cobalt naphthenate;
10. Titanium tetrafluoride or tetrachloride;
11. Alkyl ortho-titanates;
12. Titanium tetrachloride ether complexes;
13. Quaternary ammonium salts carrying a titanium hexaalkoxy group; titanium tetraalkoxides, alkali metal or alkaline earth metal compounds of aluminum, zirconium or titanium alkoxides;
14. Organic quaternary ammonium, sulphonium, phosphonium and oxonium hydroxides and salts;
15. Barium malonate, adipate, benzoate, etc.;
16. Lead, zinc, cadmium or manganese salts of the monoalkyl ester of a phenylene dicarboxylic acid;

17. Antimony catechuic complexes with an amino alcohol or with an amine and an alcohol;

18. Uranium trioxide, tetrahalide, nitrate, sulphate or acetate.

The following are examples of catalysts (C) which are suitable for accelerating both steps (a) and (b) of the reaction:

1. Barium, magnesium, zinc, cadmium, aluminum, manganese and cobalt as the metals or their oxides, hydrides, formates, alcoholates, glycolates or preferably, as acetates;

2. Aluminum chloride and bromide;

3. Zinc, manganese(II), cobalt, magnesium, chromium, ion and cadmium succinates, butyrates, adipates, or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g. zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 carbon atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product (cf. "Polyesterfasern" by H. Ludewig, 2nd Edition, publishers Adademie-Verlag, Berlin 1974). The following are examples of such inhibitors: phosphoric acid, phosphorous acid and aliphatic, aromatic and araliphatic esters thereof, e.g. the alkyl esters having from 6 to 18 carbon atoms in the alcohol component, phenyl esters in which the phenyl groups can carry 1 to 3 substituents having 6 to 18 carbon atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyethylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The second component of the composition is an organic compound containing at least one imide group and having a melting point greater than 240° C. Useful families of imide-group containing compounds include N,N'-arylenediphthalimides wherein the arylene group includes phenylene, diphenylene, naphthylene and sulfone bridged bisphenyls, tetrabrominated phthalimides, N,N'bis(dibromocyclohexane dicarboxyimides) with various bridging groups, and N,N'-alkylenebis(tetrahalophthalimides).

Preferred imide group containing compounds are those corresponding to the following formula:

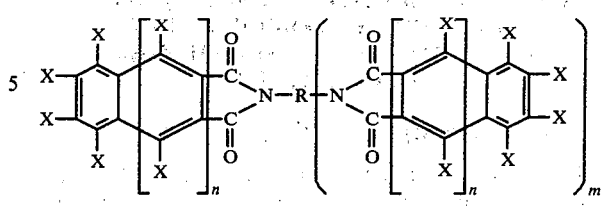

wherein
both n and m may be 1 or 0,

X may be halogen, particularly chlorine or bromine, or hydrogen, but is halogen when R is alkyl, and R is a $C_1$ to $C_6$ alkyl group, a single bond, a phenylene group, a tolulene group, a cyclohexylene group, a bis phenyl methane group, a bis cyclohexyl methane group, or a naphthylene group.

The N,N'-alkylenebis(tetrahalophthalimides) suitable in the present invention and a process for their production are described in U.S. Pat. No. 4,087,441, incorporated herein by reference. The preferred N,N'-alkylenebis(tetrahalophthalimides) are represented by the formula

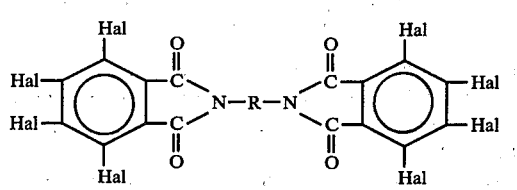

wherein
R represents a $C_1$–$C_6$ alkyl group, preferably a $C_2$–$C_6$ alkyl group, and most preferably an ethyl group, and Hal which may be the same or different, represents a halogen atom, preferably Br or Cl, and most preferably Br.

The most particularly preferred N,N'-alkylenebis(tetrahalophthalimide) is N,N'-ethylenebis(tetrabromophthalimide) (R is an ethyl group and Hal is a Br atom). The utility of these types of imide group containing components is known to enhance fire retardant properties in polyethylene terephthalate (see e.g. Japanese patent application No. 75-119041) and other polyesters (see e.g. U.S. Pat. Nos. 3,624,024 and 3,873,567 and British Pat. No. 1,287,934).

Other suitable imide group containing compounds include 1,4,5,6 tetrabromo-2,3-phthaloimide; N methylol tetrabromo phthalimide; N,N-bis-(1,4,5,6-tetrabromo-2,3-phthaloimide); N,N'-p-phenylene-diphthalimide; N,N'-di-phthalimidodiphenyl; bis-(N phenylphthalimido)sulphone; N,N'-p-phenylene-di-tetrachlorophthalimide; 4,4'-di-tetrachlorophthalimido diphenyl; N-(tetrachlorophthalimido)-tetrachlorophthalimide, N,N'-p-phenylene-di-tetrabromophthalimide; N,N'-di-tetrabromophthalimido diphenyl; N-(tetrabromophthalimido)-tetrabromophthalimide; N,N'-bis-(5,6-dibromocyclohexane-2,3-dicarboximide); and N,N'-(1,2ethane)-bis-(5,6 dibromocyclohexane-2,3-dicarboximide). Further suitable imide containing compounds are disclosed in U.S. Pat. Nos. 3,868,388; 3,873,567; 3,915,930; 3,923,734; 4,001,179 and 4,003,862 and in allowed U.S. patent application Ser. No. 868,145 filed Jan. 9, 1978 all incorporated herein by reference. Further suitable imides are also disclosed in British Pat. No. 1,287,934.

The amounts of components present may vary over a wide range. Generally, the compositions should contain from 80 to 97%, and preferably 85 to 95%, by weight of polyethylene terephthalate, and from 3 to 20%, and preferably 5 to 15% by weight of the imide-group containing compound.

It is preferred that the composition be free of glass fibers of 0.4 mm or greater in length and particularly preferred that it be free of glass fibers. It is also preferred that the composition contain less than about 0.5 wt %, especially 0.1 wt % of any additive other than the imide which has a melting point in excess of 240° C. Included among such additives are carbon powders, the oxides, sulfates, phosphates, silicates, oxalates, stearates, benzoates, salicylates and tartrates of metals of Group II of the Periodic Table and neutral clays. Particularly disfavored additives include graphite, talc, calcium benzoate, zinc oxide, calcium sulafate, calcium oxalate, carbon black, and titanium dioxide. The nucleating agents disclosed in U.S. Pat. No. 3,368,995 incorporated herein by reference are unnecessary to the compositions used in the process of the present invention and may be excluded therefrom.

Injection molding conditions for polyethylene terephthalates are well known to those skilled in the art and are taught in U.S. Pat. No. 3,516,957, incorporated herein by reference, and *Injection Molding Theory and Practice*, by Ervin I. Rubin, published by Wiley Interscience, 1972. Generally, these conditions involve temperatures of between about 250° and 310° C., residence times at elevated temperatures of between about 1 and 15 minutes, pressures of up to about 20,000 psi and shear rates of between about 100 and 10,000 reciprocal seconds. These conditions may also include vacuums of down to 20 inches of Hg. Of course, these conditions also include mold temperatures of between about 100° and 200° C. but as will become apparent, the composition of the present invention may be molded at lower temperatures and shorter mold times.

The mixtures of polyethylene terephthalate and imide-group containing compound can be obtained in usual commercial mixing apparatus such as kneaders and one-shaft or two-shaft screw extruders. The solidified melt of the mixtures can be granulated for further processing, and this can be followed by a postcondensation in the solid phase.

The compositions of the present invention may be molded at mold temperatures of below about 120° C. and still yield the superior mechanical and chemical properties which make these resins attractive for injection molded articles. When used in compositions of the present invention, these polymers may be molded under such less favorable conditions (colder molds, e.g. below about 120° C., and shorter residence time in the mold, e.g. less than about 60 seconds) than was previously possible. Thus, the present invention includes a process for molding resins based primarily, and preferably solely, upon terephthalic acid and ethylene glycol at mold temperatures of no more than about 120° C. and no less than 70° C., preferably between 80° and 110° C.

The process comprises intimately blending the terephthalic acid/ethylene glycol based resin and imide-group containing compound and injection molding the composition so prepared into molds held at temperatures less than about 120° C., preferably less than about 110° C. The polyester consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. The polyester should have a minimum intrinsic viscosity of about 0.3 dl/g, preferably 0.5 dk/g (measured as a 0.5% strength by weight solution in a phenol/tetrachloroethane mixture in a weight ratio of 1:1 at 25° C.).

In a preferred embodiment of this process aspect of the present invention, the residence time in the mold is significantly less than that required for the unmodified polyester (e.g. pure resin) in making the same part. For small, fairly simple parts this may be less than about 30 seconds, more preferably less than about 20 seconds and most preferably less than 10 seconds as compared to 40 seconds or more of unmodified resin. Of course, significant reductions in the mold residence time of resins modified with conventional additives such as micro talc nucleating agent are also obtained by further modifying these resins with appropriate amounts of the imide group containing compound of the present invention.

The usual quantities of stabilizers, preferably from 0.01 to 0.5% by weight, based on the weight of the polyethylene terephthalates can be added to protect against thermooxidative degradation. Suitable stabilizers include phenols and phenol derivatives, particularly sterically hindered phenols which have alkyl substituents with 1 to 6 carbon atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5-di-tert.-butyl-4-hydroxybenzyl)-benzene; 4,4'-butylidene-bis-(6-tert.-butyl-m-cresol); 3,5-di-tert.-butyl-4-hydroxybenzyl-phosphonic acid diethyl ester; N,N'-bis-($\beta$-naphthyl)-p-phenylenediamine; N,N'-bis-(1-methylheptyl)-p-phenylenediamine; phenyl-$\beta$-naphthylamine; 4,4'-bis-($\alpha$,$\alpha$-dimethylbenzyl)-diphenylamine; 1,3,5-tris-(3,5-di-tert.-butyl-4-hydroxy-hydrocinnamoyl)hexahydro-s-triazine; hydroquinone; p-benzoquinone, toluhydroquinone; p-tert.-butyl-pyrocatechol; chloranil; naphthoquinone; copper naphthenate; copper octoate; CU(I)Cl/triphenyl-phosphate; CU(I)Cl/trimethylphosphite; CU(I)Cl/trischloroethyl-phosphite; CU(I)Cl/tripropylphosphite; and p-nitrosodimethylaniline. Also suitable as stabilizing agents against molecular weight degradation from hydrolysis are carbodiimides.

Inorganic or organic pigments, dyes, lubricants and mold release agents such as zinc stearate, montan wax, UV absorbers and the like can also be added in the usual quantities.

Additional flame-retardant materials can be added in amounts of from 2 to 20% by weight, based on the composition. Such known flame-retarding agents include halogen-containing compounds, elementary phosphorus or phosphorus compounds, phosphorus-nitrogen compounds, antimony trioxide or mixtures thereof. Specific materials include antimony, trioxide, decabromobiphenyl ether and tetrabromobisphenol-A-polycarbonate.

The crystallization velocity of the thermoplastic polyester molding compositions can be increased by adding nucleating agents in quantities of from 0.01 to 1% by weight, based on the quantity of polyester. Compounds of this kind are known in the art (cf. Kunststoff- Handbuch, Volume VIII, "Polyester", Carl Hanser Verlag, Munich, 1973, page 701).

The thermoplastic compositions of this invention are suitable for the manufacture of all kinds of molded articles by injection molding and also for the production of films and fibers.

In all of the examples which follow the compositions were prepared for extrusion by tumbling polyethylene terephthalate pellets with all the indicated additives, all of which are in powder form, for two and one half minutes and then, when indicated, the composition was tumbled an additional twenty seconds with the chopped strand glass fibers.

These tumble blended compositions were extruded to pellets in a Waldron-Hartig 1½" single screw extruder with a 24:1 L/D barrel, non-vented and fitted with a 2.75:1 CR screw (feed, 6 flights; meter, 12 flights at 0.115 inches) containing 4 rows of mixing pins 5.25 inches apart and each pin 0.25 inches apart. A 40, 60, 20 mesh screen assembly was used except when fiberglass or $Sb_2O_3$ were part of the composition. The temperature profile was 250° C. at the rear, middle, front and die. The melt temperature was 255°–260° C., the die pressure was 0 psi and the screw was operated at 50 rpm.

Test specimens for Table I were molded from the extruded pellets using a Newbury Industries 3 oz. capacity ¾" reciprocal screw injection machine, Model H3-75RS. The thermal profile was 250° C. at the rear, front and nozzle. No primary injection was used, the secondary injection time was 10 seconds and the cure time was 10 seconds for a cycle time of twenty seconds. The primary pressure was 560 psi, the secondary pressure was 0 psi and the back pressure was 50 psi. The ram speed was 70% of maximum.

The mold was held at a temperature of 100° C. and consisted of a family of cavities providing:

2×3 inch color chip stepped to 0.1 and 0.125 inch thickness
½×5×¼" bar
2½×2½×⅛" bars
½×7×0.275" to 0.060 tapered bar
½×5×1/16" bar All cavities were chrome plated DME No. 3 steel, and were equipped with runner shut offs.

The materials and amounts of materials (in parts by weight) were as indicated in Table I. The compositions were tested under UL Subject 94 testing. According to this test, test specimens molded in 5 in×0.5 in×0.062 in (127 mm×12.7 mm×1.6 mm) dimensions were mounted vertically so that the bottom of the specimen was 12 in (305 mm) above a swatch of surgical cotton. A complete set of specimens consists of 5 sample bars.

Each test bar was individually ignited for two successive 10 second ignitions and the burning characteristics after each ignition were noted and the sample rated. A Bunsen burner of defined dimensions is used to ignite the sample with a ¾" (10 mm) blue flame from natural gas having approximately 1000 BTU/$ft^3$ heat content. If only one specimen falls out of the defined rating for the rest of the set, a complete 5 specimen test is made and rated as the lowest result. The rating system is as follows (from best to lowest).

UL 94-V-0 classification shall:
1. not contain any samples which burn for more than 10 seconds after each application of the test flame,
2. not have a total flaming time more than 50 seconds for the 10 flame applications of each set (5 samples),
3. not have any specimens which burn completely up to the holding clamp,
4. not have any specimens which ignite the cotton (below the specimen) with flaming drips or particles,
5. not have any specimens which glow longer than 30 seconds after removal of the test flame.

UL 94-V-1 classification shall:
1. not have any specimens which burn longer than 30 seconds after removal of test flame,
2. not have a total burn time longer than 250 seconds for the 10 flame applications for each set (5 samples),
3. not have any specimens that burn completely up to the holding clamp,
4. not have any specimens which ignite the cotton (below the sample) with burning drips or particles,
5. not have any specimens which glow longer than 60 seconds after removal of the test flame.

UL 94-V-2 classification shall:
1. not have any specimens which burn longer than 30 seconds after removal of test flame,
2. not have a total burn time longer than 250 seconds for the 10 flame applications of each set (5 samples),
3. not have any specimens which completely burn up to the holding clamp,
4. have specimens which ignite the cotton (below the sample) with burning drips or particles,
5. not have any specimens which glow longer than 60 seconds after removal of test flame,
6. not have any specimens which burn beyond the 4 in (101.6 mm) reference mark when ignited in a horizontal mounting position.

The results of such tests were as indicated in Table I.

TABLE I

|  | Comparison Example 1 | Examples | | | | | | |
|---|---|---|---|---|---|---|---|---|
|  |  | 1 | 2 | 3 | 4 | 5 | 6 | 7 |
| VFR 5041 | 8.5 | 8.0 | 8.15 | 8.1 | 8.05 | 8.2 | 8.3 | 8.4 |
| Sb | 0.5 | 0.5 | 0.35 | 0.4 | 0.45 | 0.5 | 0.5 | 0.5 |
| DBDPE | 1.0 | — | — | — | — | — | — | — |
| BT-93 | — | 1.5 | 1.5 | 1.5 | 1.5 | 1.3 | 1.2 | 1.1 |
| UL 94 Rating | V-0 60% | V-0 | V-0 | V-0 | V-0 80% | V-0 60% | V-0 | V-0 40% |

TABLE I-continued

|  | Comparison V-2 40% | Examples |
|---|---|---|

VFR 5041: A polyethylene terephthalate available from Goodyear, having an intrinsic viscosity of 1.04 dl/g measured as a 0.5% by weight solution in a 1:1 mixture of phenol and tetrachloroethane at 25° C.
Sb: Antimony trioxide.
DBDPE: Decabromodiphenylether
BT:93:

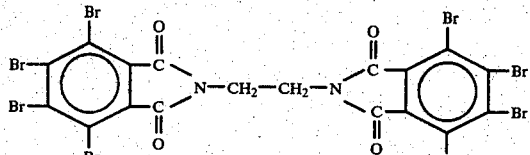

Melting point ~ 450° C.

The compositions of Table I contained a low level (less than 0.3 wt %) of a stabilizer system not believed to affect the crystallization or molding behavior of the compositions.

EXAMPLES 8–9 AND COMPARISON EXAMPLES 2–5

For these examples, test specimens were molded from the extruded pellets using a Newbury Industries 4 oz. capacity reciprocal screw injection machine. The thermal profile was 250° C. at the rear and front and 240° C. at the nozzle. No primary injection was used; the secondary injection time was 10 seconds and the cure time was 10 seconds for a cycle time of twenty seconds. The primary pressure was 300 psi; the secondary pressure was 0 psi and the back pressure was 50 psi. The ram speed was 70% of maximum.

The mold was held at a temperature of 100° C. and consisted of a family of cavities providing:
4" diameter × ¼" disc
4" diameter × ⅛" disc
4" diameter × 1/10" disc
4" diameter × 1/16" disc.

All cavities were chrome plated DME No. 3 steel and were equipped with runner shut-offs.

The materials and amounts of materials (in parts by weight) were as indicated in Table II. The parts noted were tested for warpage. In testing for warpage, discs are molded at 250° C. melt temperature in a mold kept at 100° C. for 20 seconds. Upon annealing at 150° C. for 24 hours, shrinkage (if any) will cause the disc to curl. The measurement (in mm) reported is the depth of the concave curvature formed. The lower the number, the higher the degree of crystallinity. The discs are tested in a size of ⅛"×4" (diameter).

TABLE II

|  | Comparison Examples | | | | Examples | |
|---|---|---|---|---|---|---|
|  | 2 | 3 | 4 | 5 | 8 | 9 |
| VFR 5041 | 10 | — | 9 | — | 9 | — |
| TENITE 7741 | — | 10 | — | 9 | — | 9 |
| BT 93 | — | — | — | — | 1 | 1 |
| MP | — | — | 1 | 1 | — | — |
| ⅛ × 4" disc |  |  |  |  |  |  |
| Before ann. | 4.38 | 3.52 | 3.85 | 3.03 | 1.45 | 1.32 |

TABLE II-continued

|  | Comparison Examples | | | | Examples | |
|---|---|---|---|---|---|---|
|  | 2 | 3 | 4 | 5 | 8 | 9 |
| After ann. | 4.83 | 3.58 | 4.67 | 2.99 | 1.43 | 1.32 |

MP: N-methyl tetrachlorophthalimide

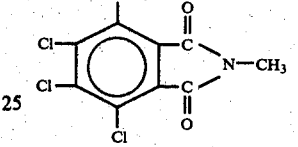

Melting point ~ 195° C.
TENITE 7741: A polyethylene terephthalate available from Eastman Kodak having an intrinsic viscosity of 0.54 dl/g measured as a 0.5% by weight solution in a 1:1 mixture of phenol and tetrachloroethane at 25° C.

The compositions of Table II contained a nucleating amount of micro talc and a low level of a stabilizer system not believed to affect the crystallization or warpage behavior of these compositions.

The lower degree of warpage observed for the compositions containing the organic imide group containing compound which melts at greater than 240° C. (BT 93) is evidence that these compositions have improved or accelerated crystallization velocities. Thus, with appropriate tailoring of the part geometry and molding conditions, it is possible to obtain fully crystallized and therefore warpage-free parts at lower temperatures and with faster mold cycles than would be possible with compositions not containing this additive. The prior art has generally not recognized the possibility of molding into molds at temperatures significantly below 140° C., particularly below 120° C., and still obtaining highly crystalline parts not requiring further heat treatment.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A process for injection molding a thermoplastic composition comprising:
    (a) intimately blending (i) from 80 to 97% by weight of a polyethylene terephthalate having an intrinsic viscosity of at least 0.3 dl/g measured as a 0.5% by solution in in a 1:1 mixture of phenol and tetrachloroethane at 25° C.; and (ii) from 3 to 20% by weight of an organic compound containing at least one imide group and having a melting point greater than 240° C., and
    (b) injecting molding said blend into a mold held at a temperature of no more than 110° C. and of no less than 80° C.

* * * * *